US010557723B2

(12) United States Patent
Lee et al.

(10) Patent No.: US 10,557,723 B2
(45) Date of Patent: Feb. 11, 2020

(54) APPARATUS FOR DETECTING AN ANGLE OF ROTATION

(71) Applicant: Haechitech Corporation, Cheongju-si (KR)

(72) Inventors: Hae Jung Lee, Daegu-si (KR); Kyoung Suck Ki, Cheongju-si (KR)

(73) Assignee: Haechitech Corporation, Cheongju-si (KR)

( * ) Notice: Subject to any disclaimer, the term of this patent is extended or adjusted under 35 U.S.C. 154(b) by 278 days.

(21) Appl. No.: 15/596,565

(22) Filed: May 16, 2017

(65) Prior Publication Data
US 2018/0149495 A1 May 31, 2018

(30) Foreign Application Priority Data

Nov. 29, 2016 (KR) .......................... 10-2016-0160338

(51) Int. Cl.
*G01D 5/14* (2006.01)

(52) U.S. Cl.
CPC .................................... *G01D 5/145* (2013.01)

(58) Field of Classification Search
CPC ........ G01D 5/145; G01D 5/142; G01R 15/20; G01R 15/202; G01R 33/06; G01R 33/07; G01R 33/077; G01N 2011/0086; G04C 5/00; H02K 49/102
USPC ................. 324/207.2, 71.1, 207.25; 702/150
See application file for complete search history.

(56) References Cited

U.S. PATENT DOCUMENTS

| 7,288,931 | B2 * | 10/2007 | Granig ................ H03M 1/06 324/202 |
| 8,749,005 | B1 * | 6/2014 | Foletto ................ H01L 29/82 257/427 |
| 8,942,952 | B2 * | 1/2015 | Ueda ................ G01D 5/2451 324/207.22 |
| 9,007,057 | B2 | 4/2015 | Villaret |
| 9,175,982 | B2 | 11/2015 | Suk et al. |
| 9,618,318 | B2 | 4/2017 | Schaaf |
| 2005/0127767 | A1 * | 6/2005 | Gallant ................ H02K 7/02 310/113 |

(Continued)

FOREIGN PATENT DOCUMENTS

| JP | 61-45906 A | 3/1986 |
| JP | 2001-20311 A | 7/2001 |

(Continued)

*Primary Examiner* — Tung X Nguyen
*Assistant Examiner* — Robert P Alejnikov, Jr.
(74) *Attorney, Agent, or Firm* — NSIP Law

(57) ABSTRACT

An apparatus for detecting an angle of rotation includes a rotatable member situated in a first plane and rotatable to be switched between a reference state and rotated states, the rotatable member being unrotated in the reference state, magnet pieces arranged on the rotatable member along a circumferential direction of the rotatable member at intervals of an angle, the magnet pieces moving along a first locus as the rotatable member is rotated, a Hall sensor lying in a second plane spaced a distance apart from the first plane and positioned along a second locus, said second locus being a projection of the first locus into the second plane, and the Hall sensor providing an output varying as the rotatable member is rotated, and a processor configured to detect an angle of rotation of the rotatable member in response to the output from the Hall sensor.

30 Claims, 13 Drawing Sheets

(56) References Cited

U.S. PATENT DOCUMENTS

| | | | | |
|---|---|---|---|---|
| 2008/0252285 | A1* | 10/2008 | Passwater | G01D 5/145 |
| | | | | 324/207.25 |
| 2011/0199074 | A1* | 8/2011 | Kang | G01B 7/30 |
| | | | | 324/207.25 |
| 2011/0309824 | A1* | 12/2011 | Takahashi | F16C 41/007 |
| | | | | 324/207.13 |
| 2014/0195193 | A1* | 7/2014 | Tamiya | G01D 5/34792 |
| | | | | 702/150 |
| 2016/0011010 | A1 | 1/2016 | Muthers | |
| 2016/0305795 | A1* | 10/2016 | Eisenbeis | G01D 7/007 |
| 2016/0305975 | A1* | 10/2016 | Kock | B62D 63/04 |
| 2016/0334830 | A1* | 11/2016 | Sirohiwala | G01D 5/145 |

FOREIGN PATENT DOCUMENTS

| | | |
|---|---|---|
| KR | 10-2010-0126273 A | 12/2010 |
| WO | WO 2013/046472 A1 | 4/2013 |

* cited by examiner

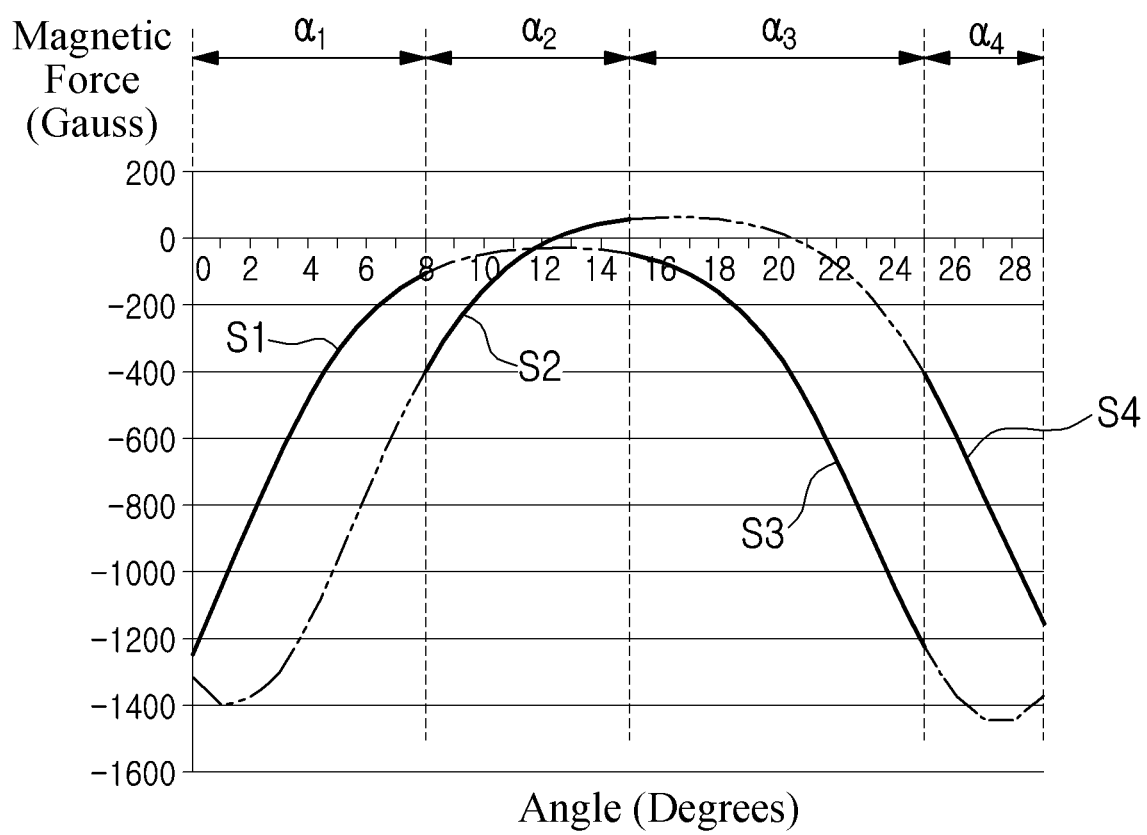

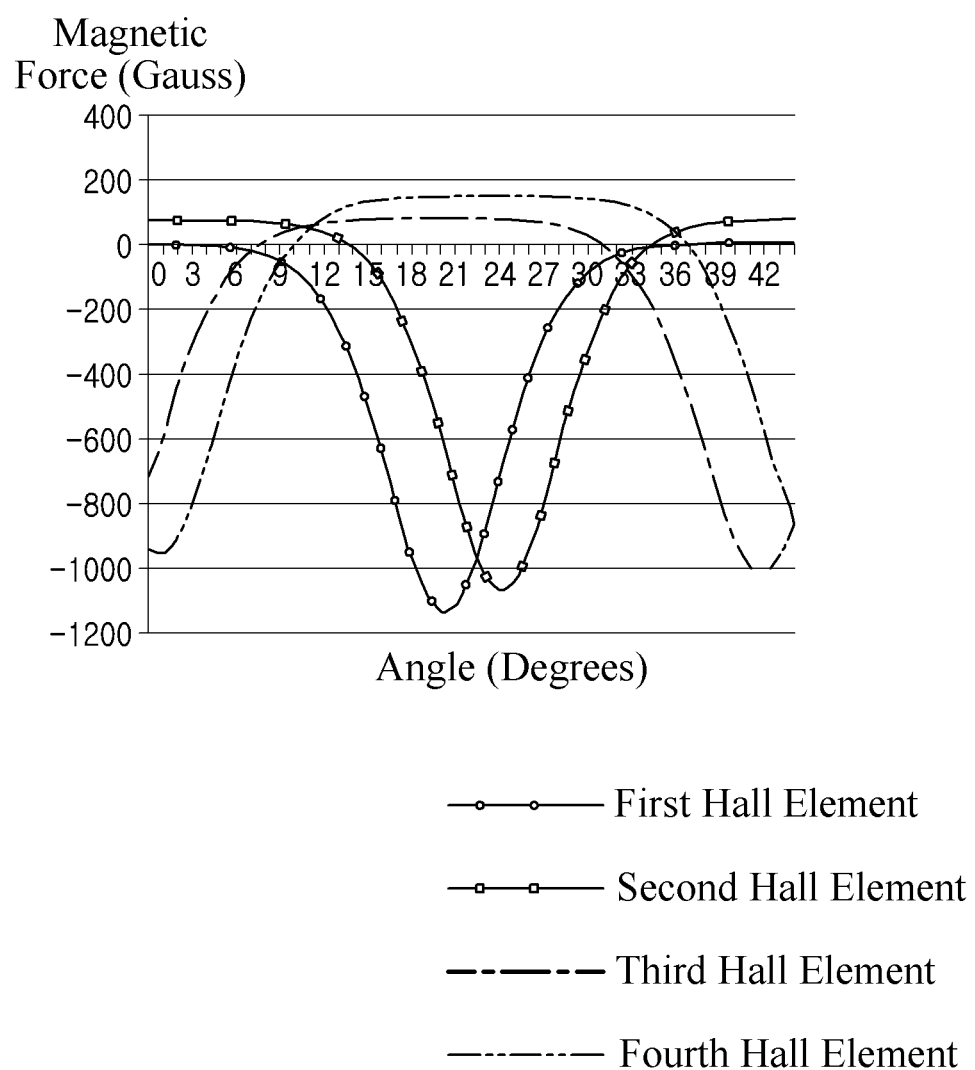

APPARATUS FOR DETECTING AN ANGLE OF ROTATION

CROSS-REFERENCE TO RELATED APPLICATIONS

This application claims the benefit under 35 USC 119(a) of Korean Patent Application No. 10-2016-0160338 filed on Nov. 29, 2016 in the Korean Intellectual Property Office, the entire disclosure of which is incorporated herein by reference for all purposes.

BACKGROUND

1. Field

The following description relates to detecting an angle of rotation. The following description also relates to detecting an angle of rotation using at least one Hall sensor.

2. Description of Related Art

Various detectors are widely used in the industry to detect a state change of a device for various purposes. Rotation angle detectors, which are known as encoders, for detecting changes of the rotation angle of the rotatable member among the detectors are known. The rotation angle detectors commonly adopt a Hall sensor, which senses the intensity of a magnetic fringe field and outputs information indicative of magnetic force proportional to the sensed intensity. A rotation angle detector having a structure in which a permanent magnet is attached to the rotatable member and several of Hall sensors are disposed around the permanent magnet is known among the rotation angle detectors that adopt the Hall sensor design. However, there is a disadvantage to such an approach in that the rotation angle detector is unable to situate the magnets in the center of the rotatable member and cannot be adapted to being used in wearable devices, which have been recently developed and evolved. Furthermore, there is an issue that the rotation angle detector calculates the rotation angle with a larger error range when a rotator rotates at high speed, is unable to accurately measure the rotation angle when the rotator rotates at low speed, and is also unable to measure the rotation angle when the rotator rotates in the reverse direction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for detecting an angle of rotation includes a rotatable member situated in a first plane and rotatable to be switched between a reference state and rotated states, the rotatable member being unrotated in the reference state, magnet pieces arranged on the rotatable member along a circumferential direction of the rotatable member at intervals of an angle, the magnet pieces moving along a first locus as the rotatable member is rotated, a Hall sensor situated in a second plane spaced a predetermined distance apart from the first plane and positioned along a second locus, the second locus being a projection of the first locus into the second plane, and the Hall sensor providing an output varying as the rotatable member is rotated, and a processor configured to detect an angle of rotation of the rotatable member in response to the output from the Hall sensor.

The rotatable member may be a disc-shaped plate or a ring-shaped plate.

The Hall sensor may be located to be opposite to one of the magnet pieces when the rotatable member is in the reference state.

The magnet pieces may include 12 magnet pieces, the Hall sensor may include a first Hall element and a second Hall element, and the output from the Hall sensor may include a first output from the first Hall element and a second output from the second Hall element.

The processor may be further configured to detect the angle of rotation of the rotatable member based on the first and second outputs.

The processor may be further configured to detect the angle of rotation of the rotatable member based on the first and second outputs and using an equation that is a cubic polynomial.

The processor may be further configured to detect the angle of rotation of the rotatable member using the first output and a first equation that is a cubic polynomial, in response to the first output being less than a first value and greater than a second value and the first output being greater than the second output.

The processor may be further configured to detect the angle of rotation of the rotatable member using the second output and a second equation that is a cubic polynomial, in response to the first output being greater than the first value.

The processor may be further configured to detect the angle of rotation of the rotatable member using the first output and a third equation that is a cubic polynomial, in response to the first output being less than the first value and greater than the second value and the first output being less than the second output.

The processor may be further configured to detect the angle of rotation of the rotatable member using the second output and a fourth equation that is a cubic polynomial, in response to the first output being less than the second predetermined value.

The processor may be further configured to detect the angle of rotation of the rotatable member using a mapping table.

The magnet pieces may include 8 magnet pieces, the apparatus may include a first Hall sensor and a second Hall sensor, the second Hall sensor being spaced a second predetermined angle apart from the first Hall sensor along the second locus, the first Hall sensor may include a first Hall element and a second Hall element, the second Hall sensor may include a third Hall element and a fourth Hall element, and the output from the first Hall sensor and the second Hall sensor may include a first output from the first Hall element, a second output from the second Hall element, a third output from the third Hall element and a fourth output from the fourth Hall element.

The processor may be further configured to detect the angle of rotation of the rotatable member corresponding to the current rotated state of the rotatable member based on the first to fourth outputs.

The processor may be further configured to detect the angle of rotation of the rotatable member corresponding to the current rotated state of the rotatable member based on the first to fourth outputs and using an equation that is a cubic polynomial.

The processor may be further configured to detect the angle of rotation of the rotatable member corresponding to the current rotated state of the rotatable member using the third output and a first equation that is a cubic polynomial, in response to the third output being less than a first value and greater than a second value and the third output being greater than the fourth output.

The processor may be further configured to detect the angle of rotation of the rotatable member corresponding to the current rotated state of the rotatable member using the first output and a second equation that is a cubic polynomial, in response to the first output being less than the first predetermined value and greater than a third predetermined value and the first output being less than the second output.

The processor may be further configured to detect the angle of rotation of the rotatable member corresponding to the current rotated state of the rotatable member using the second output and a third equation that is a cubic polynomial, in response to the first output being less than the third predetermined value.

The processor may be further configured to detect the angle of rotation of the rotatable member corresponding to the current rotated state of the rotatable member using the first output and a fourth equation that is a cubic polynomial, in response to the first output being less than the first predetermined value and greater than the third predetermined value and the first output being greater than the second output.

The processor may be further configured to detect the angle of rotation of the rotatable member corresponding to the current rotated state of the rotatable member using the third output and a fifth equation that is a cubic polynomial, in response to the third output being less than the first predetermined value and greater than the second predetermined value and the third output being less than the fourth output.

The processor may be further configured to detect the angle of rotation of the rotatable member corresponding to the current rotated state of the rotatable member using the fourth output and a sixth equation that is a cubic polynomial, in response to the third output being less than the second predetermined value.

The magnet pieces may include 12 magnet pieces, the Hall sensor may include a planar Hall element and a vertical Hall element, and the output from the Hall sensor may include a first output from the planar Hall element and a second output from the vertical Hall element.

The processor may be further configured to detect the angle of rotation of the rotatable member corresponding to the current rotated state of the rotatable member based on the first and second outputs.

The processor may be further configured to detect the angle of rotation of the rotatable member corresponding to the current rotated state of the rotatable member based on the first and second outputs and using an equation that is a cubic polynomial.

The processor may be further configured to detect the angle of rotation of the rotatable member corresponding to the current rotated state of the rotatable member using the first output and a first equation that is a cubic polynomial, in response to the second output being greater than a value.

The processor may be further configured to detect the angle of rotation of the rotatable member corresponding to the current rotated state of the rotatable member using the first output and a second equation that is a cubic polynomial, in response to the second output being equal to or less than the predetermined value.

In another general aspect, an apparatus for detecting an angle of rotation includes a rotatable member rotatable about a center axis of the rotatable member, twelve magnet pieces arranged in a manner spaced apart from one another along a circumferential direction of the rotatable member on a bottom surface of the rotatable member, a Hall sensor located apart from the bottom surface of the rotatable member, wherein the Hall sensor includes a first Hall element and a second Hall element, a magnet piece of the twelve magnet pieces passes above the Hall sensor as the rotatable member is rotated, and the first Hall element and the second Hall element respectively provide outputs varying as the rotatable member is rotated, and a processor configured to detect an angle of rotation of the rotatable member in response to the output from the first Hall element and the output from the second Hall element.

Each of the first and second Hall elements may be a planar Hall element, and the processor may be further configured to detect an angle of rotation of the rotatable member based on the output from the first Hall element and the output from the second Hall element using four different equations that are cubic polynomials.

The first and second Hall elements may be a planar Hall element and a vertical Hall element, respectively, and the processor may be further configured to detect an angle of rotation of the rotatable member based on the output from the first Hall element and the output from the second Hall element using two different equations that is a cubic polynomial.

The processor may be further configured to detect the angle of rotation of the rotatable member using a mapping table.

In another general aspect, an apparatus for detecting an angle of rotation includes a rotatable member rotatable about a center axis of the rotatable member, eight magnet pieces arranged in a manner spaced apart from one another along a circumferential direction of the rotatable member on a bottom surface of the rotatable member, two Hall sensors located apart from the bottom surface of the rotatable member, wherein the two Hall sensors include a first Hall sensor and a second Hall sensor, the first Hall sensor includes a first Hall element and a second Hall element, the second Hall sensor includes a third Hall element and a fourth Hall element, each of the first and second Hall sensors is arranged so that a magnet piece of the eight number of magnet pieces passes above the respective Hall sensor as the rotatable member is rotated, and the first to fourth Hall elements respectively provide first to fourth outputs varying as the rotatable member is rotated, and a processor configured to detect an angle of rotation of the rotatable member based on the first to fourth outputs using six different equations that are cubic polynomials.

The processor may be further configured to detect the angle of rotation of the rotatable member using a mapping table.

Other features and aspects will be apparent from the following detailed description, the drawings, and the claims.

BRIEF DESCRIPTION OF THE DRAWINGS

FIG. 5 is a graph where the remaining portions excluding the portions determined to have resulted from measurement errors in the output waveforms in FIG. 4 are indicated by solid lines, according to an example.

FIG. 7 is a graph illustrating output waveforms produced by the Hall elements as the rotatable member is rotated from 0 degree to 44 degrees by 1 degree increments in the second example of the apparatus.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
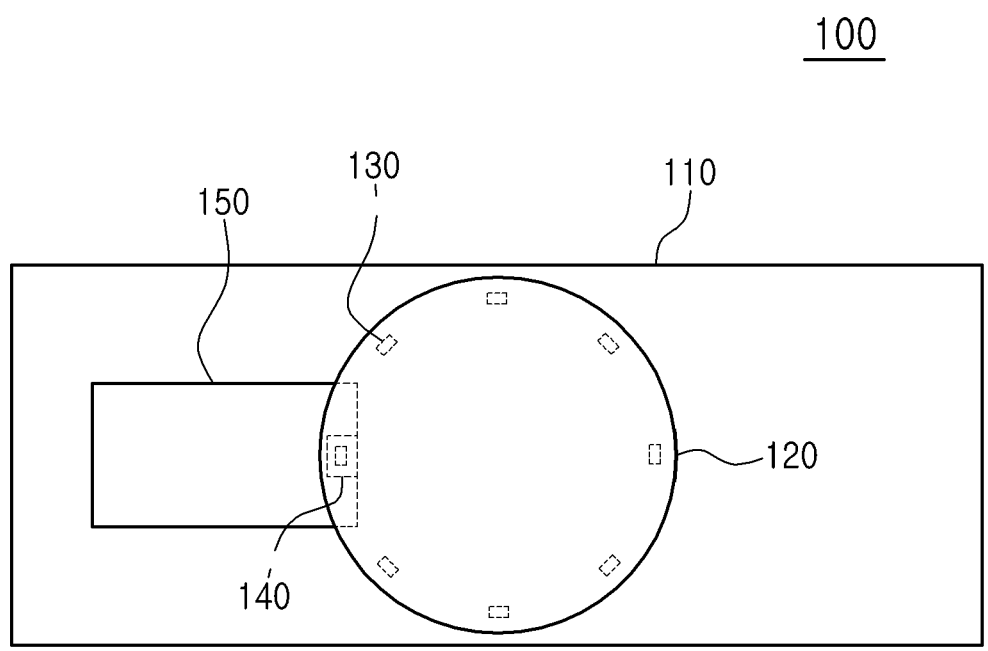
FIGS. 1A and 1B are views to schematically explain an apparatus for detecting an angle of rotation, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Expressions such as "first conductivity type" and "second conductivity type" as used herein may refer to opposite conductivity types such as N and P conductivity types, and examples described herein using such expressions encompass complementary examples as well. For example, an example in which a first conductivity type is N and a second conductivity type is P encompasses an example in which the first conductivity type is P and the second conductivity type is N.

In this disclosure, various examples and implementations are described in detail to provide an apparatus for detecting an angle of rotation. Examples are described in more detail below with reference to the appended drawings.

Figure 1B:
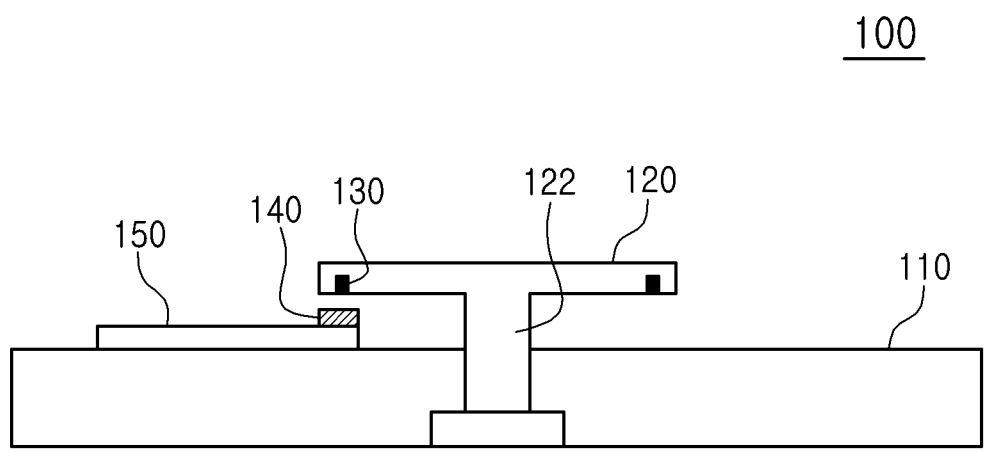

FIGS. 1A and 1B are views to schematically explain an apparatus for detecting an angle of rotation, according to an example.

As shown in the example of FIGS. 1A and 1B, the apparatus 100 for detecting the angle of rotation includes a rotatable member 120 mounted on a base member 110 in a rotatable manner. For example, when the apparatus 100 is mounted on a wearable device such as a smart watch, the base member 110 is a numeric plate of the smart watch. In an example, the rotatable member 120 is formed of a disk-shaped plate member. In such an example, the rotatable member 120 is configured to be rotatable around a rotation axis 122 that is integrally formed with the rotatable member 120, as shown in the example of FIGS. 1A and 1B. In another example, the rotatable member 120 is formed of a ring-shaped plate member. In yet another example, the rotatable member 120 is formed in various modified shapes, such that a bottom surface of the rotatable member 120 has a plate shape and the upper surface of the rotatable member 120 has a convex or curved shape. In examples, the rotatable member 120 is able to be switched from a reference state to an arbitrarily rotated state by a user's operation, wherein the reference state is a state in which the rotatable member 120 is not rotated. The user is able to switch the rotation state of rotatable member 120 continuously and freely. For example, the user is able to rotate the rotatable member 120 from the reference state to a state rotated by 20 degrees, rotates the rotatable member 120 to a state rotated by 38 degrees, rotates the rotatable member 120 to a state rotated by 183 degrees, and again rotates the rotatable member 120 to a state rotated by 170 degrees in the reverse direction. In an example, it is also possible to configure the rotatable member 120 so that the rotatable member 120 is able to be rotated with the help of other members that are interlocked with the rotatable member 120.

For example, a plurality of magnet pieces 130 are mounted on the rotatable member 120 in such a way that they are arranged at intervals of a predetermined angle along the circumferential direction of the rotatable member 120. In an example, as shown in the example of FIGS. 1A and 1B, the plurality of magnet pieces 130 are mounted on the rotatable member 120 in such a manner as to be inserted into the bottom surface of the rotatable member 120. The plurality of magnet pieces 130 are potentially formed in various shapes such as a circle, a square, a rectangle, or other shapes. Although in the example illustrated, the number of the magnet pieces 130 is 8, the number of the magnet pieces 130 is not to be limited thereto. In an example, the number of the magnet pieces 130 is one of 6 to 12. However, the number of the magnet pieces 130 is selected from various numbers depending on design and is not limited to 6 to 12. For example, when the number of the magnet pieces 130 is 8, the plurality of magnet pieces 130 are arranged at intervals of 45 degrees along the circumferential direction of the rotatable member 120, and when the number of the magnet pieces 130 is 12, the plurality of magnet pieces 130 may be arranged at intervals of 30 degrees along the circumferential direction of the rotatable member 120. Thus, the plurality of magnet pieces 130 move along a first locus of the circumferential direction as the rotatable member 120 is rotated.

In an example, the apparatus 100 further includes at least one Hall sensor. In such an example, the number of the at least one Hall sensor 140 is one or two, but the number of the Hall sensor 140 is not limited to one or two, and other examples include three or more Hall sensors 140. For example, each of the at least one Hall sensor 140 includes two Hall elements. In an example, the two Hall elements are each a planar Hall element. In another example, one of the two Hall elements is a planar Hall element and the other Hall element is a vertical Hall element. As is known in the art, the planar Hall element is an element that senses the intensity of magnetic force in a vertical direction and outputs a value of the magnetic force proportional to the sensed intensity. The vertical Hall element is an element that senses the intensity of the magnetic force in a horizontal direction and outputs a value of the magnetic force proportional to the sensed intensity. It is to be noted that throughout this specification, where values of magnetic force are provided, they are measured in units of Gauss (G).

The at least one Hall sensor 140 is disposed at locations spaced downwards from the bottom surface of the rotatable member 120, respectively. The at least one Hall sensor 140 is disposed such that the plurality of magnet pieces 130 pass through the upper portion of the Hall sensor 140 in turn as the rotatable member 120 is rotated. To explain the illustrated example, one of the magnet pieces 130 is located in an opposite relationship to the upper portion of the Hall sensor 140 when the rotatable member 120 is in a reference position. Then, the adjacent magnet piece 130 passes through the upper portion of the Hall sensor 140 when the rotatable member 120 rotates by 29 degrees or more. Furthermore, adjacent two magnet pieces 130 pass through the upper portion of the Hall sensor 140 in turn when the rotatable member 120 rotates by 59 degrees or more from the reference position. Thus, the Hall sensor 140 is disposed such that a larger number of the magnet pieces 130 pass through the upper portion of the Hall sensor 140 when the rotatable member 120 has a larger rotation angle. In an example, when the rotatable member 120 is located at the reference location, the Hall sensor 140 and the magnet pieces 130 are spaced about 0.5 to 3 mm apart from each other.

The arrangement relationship between the at least one Hall sensor 140 and the plurality of magnet pieces 130 is further described in detail. In an example, assuming that the plurality of magnet pieces 130 lie on a first plane, the at least one Hall sensor 140 lies on a second plane that is substantially parallel to the first plane and is spaced a predetermined distance apart from the first plane. More specifically, the at least one Hall sensor 140 is positioned on a second locus, which is a projection of the first locus into the second plane. In the example illustrated, one of the magnet pieces 130 is in a vertically opposite relationship to the upper portion of the Hall sensor 140 when the rotatable member 120 is in the reference position. However, it should be noted that the magnet pieces 130 and the Hall sensor 140 do not necessarily have to be disposed so as to be vertically opposed to each other at the reference position. For example, the at least one Hall sensor 140 provides the magnetic force as an output, wherein the magnetic force varies as the rotatable member 120 is rotated.

In the examples of FIGS. 1A-1B, the apparatus 110 further includes a circuit board 150, such as a PCB board, on which the at least one Hall sensor 140 is mounted. In an example, the circuit board 150 further includes an electronic module configured to detect a rotation angle of the rotatable member 120 corresponding to a current rotated state of the rotatable member 120, in response to the output of the Hall sensor 140.

Figure 2:
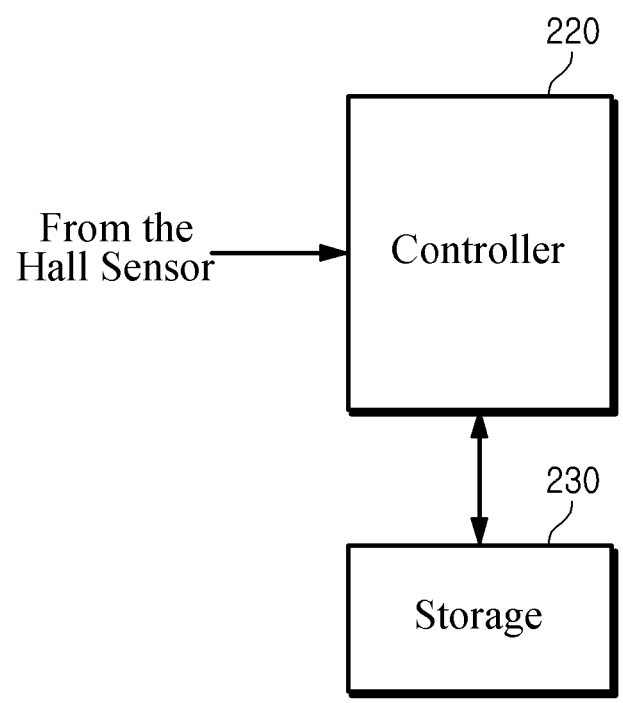
FIG. 2 shows a block diagram of an electronic module included in the circuit board shown in FIG. 1, according to an example.

FIG. 2 shows a block diagram of the electronic module included in the circuit board shown in FIGS. 1A-1B, according to an example.

As shown in the example of FIG. 2, the electronic module 200 may include a controller 220 and a storage 230. The controller 220 is configured to perform the function of detecting the rotation angle of the rotatable member 120 corresponding to the current stated state of the rotatable member 120 by using predetermined equations devised according to the present examples, based on the outputs from the Hall elements of the at least one Hall sensor 140. Specifically, the controller 220 is configured to perform the function of detecting the rotation angle of the rotatable member 120 by referring to outputs from the Hall elements of the at least one Hall sensor 140 in order to select at least one of the outputs, and by substituting the selected output into any one of the predetermined equations. In order to perform the function, the controller 220 is configured to sample the outputs from the Hall elements of the at least one Hall sensor 140 at a sampling period of several milliseconds or several microseconds. As the sampling period becomes lower, there is an advantage that the resolution for detecting the rotation angle is able to be higher. However, in order to avoid increasing the processing load of the controller 220 excessively, it is required to appropriately set the sampling period so that a sufficient number of samples are able to be obtained while a user rotates the rotatable member 120, in consideration of an average speed at which the user typically rotates the rotatable member 120. Here, the equations are determined based on output waveforms outputted from the Hall elements as the rotatable member 120 is rotated by an angle corresponding to an angle interval in which the magnet pieces of the plurality of magnet pieces 130 are arranged on the rotatable member 120. In an example, the equations are equations that approximate some segments of the output waveforms outputted from the Hall elements by using a curve fitting algorithm. In an example, the some segments of the output waveforms outputted from the Hall elements are approximated by using a three-dimensional equation. However, in another example, the some segments are approximated as two-dimensional equations, or are approximated as higher order equations in order to more accurately detect the rotation angle.

The controller 220 is configured to detect the rotation angle of the rotatable member 120 corresponding to the current rotated state of the rotatable member 120 by using mapping tables stored in the storage 230, instead of using the equations. Specifically, the controller 220 is configured to obtain information on the rotation angle of the rotatable member 120 by referring to the outputs from the Hall elements of the at least one Hall sensor 140, selecting any one of the outputs, and providing the selected output as an input to any one of the mapping tables. Such mapping tables define mapping relationships between the outputs from the Hall elements of the at least one Hall sensor 140 and the rotation angles of the rotatable member 120. As with the equations, the mapping tables are also determined based on the output waveforms outputted from the Hall elements as the rotatable member 120 is rotated by the angle corresponding to the angle interval in which the plurality of magnet pieces 130 is arranged on the rotatable member 120.

The controller 220 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers and microprocessors in terms of hardware.

The storage 230 stores the mapping tables used to obtain information on the rotation angles of the rotatable member 120 by the controller 220. The storage 230 further stores programs and/or data for an operation of the controller 220, and further stores the inputted/outputted data or the like. For example, the storage 230 includes a storage medium of at least one of a flash memory type, a hard disk type, a multimedia card micro type, a card type memory, for example, SD or XD memory, and so on, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

Figure 3:
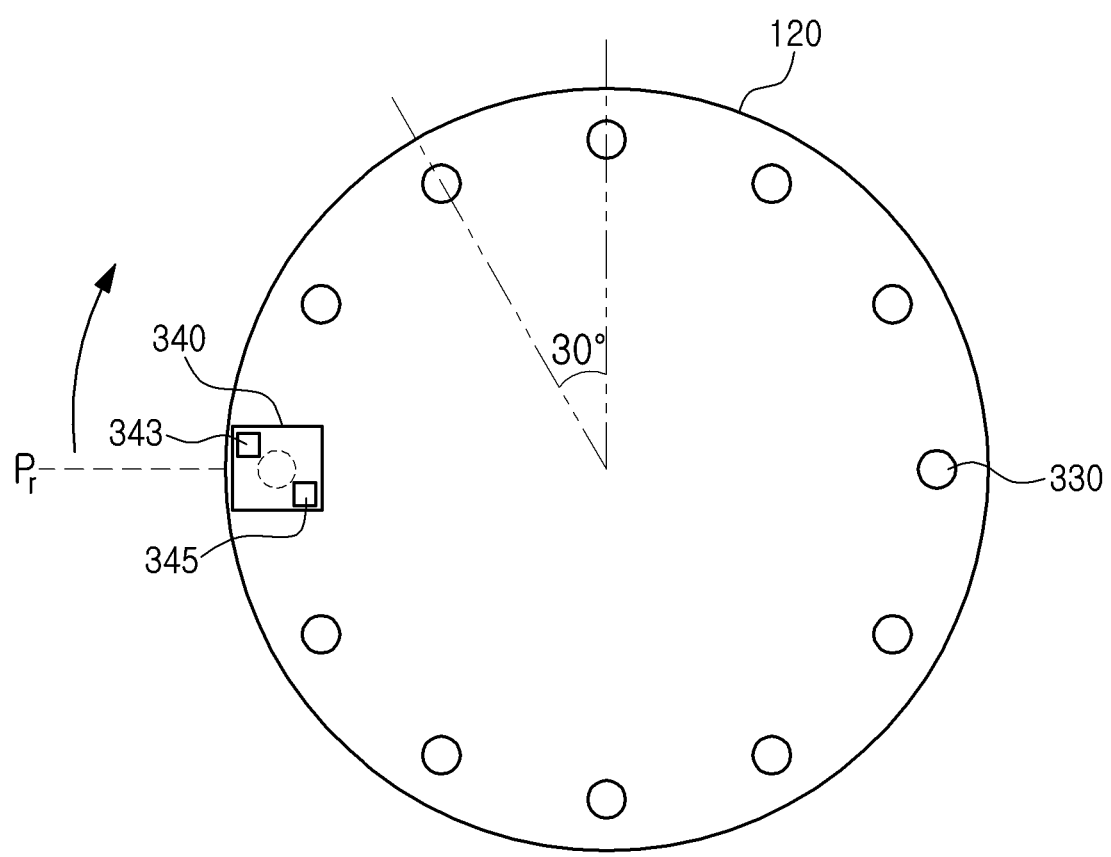
FIG. 3 is a view to explain a first example of the apparatus for detecting an angle of rotation.

FIG. 3 is a view to explain a first example of the apparatus for detecting the angle of rotation.

As shown in the example of FIG. 3, in the first example of the apparatus 100 according to the present disclosure, the twelve of the magnet pieces 330 are arranged on a bottom portion of the rotatable member 120 at an interval of 30 degrees along the circumferential direction of the rotatable member 120. One Hall sensor 340 is disposed in opposite relationship to one of the magnet pieces 330 when the rotatable member 120 is in the reference position $P_r$. In such an example, the Hall sensor 340 includes two planar-shaped Hall elements. For example, the Hall elements are a first Hall element 343 and a second Hall element 345. As the rotatable member 120 is rotated up to 30 degrees, each of the Hall elements 343, 345 provides the corresponding magnetic force as the output.

Figure 4:
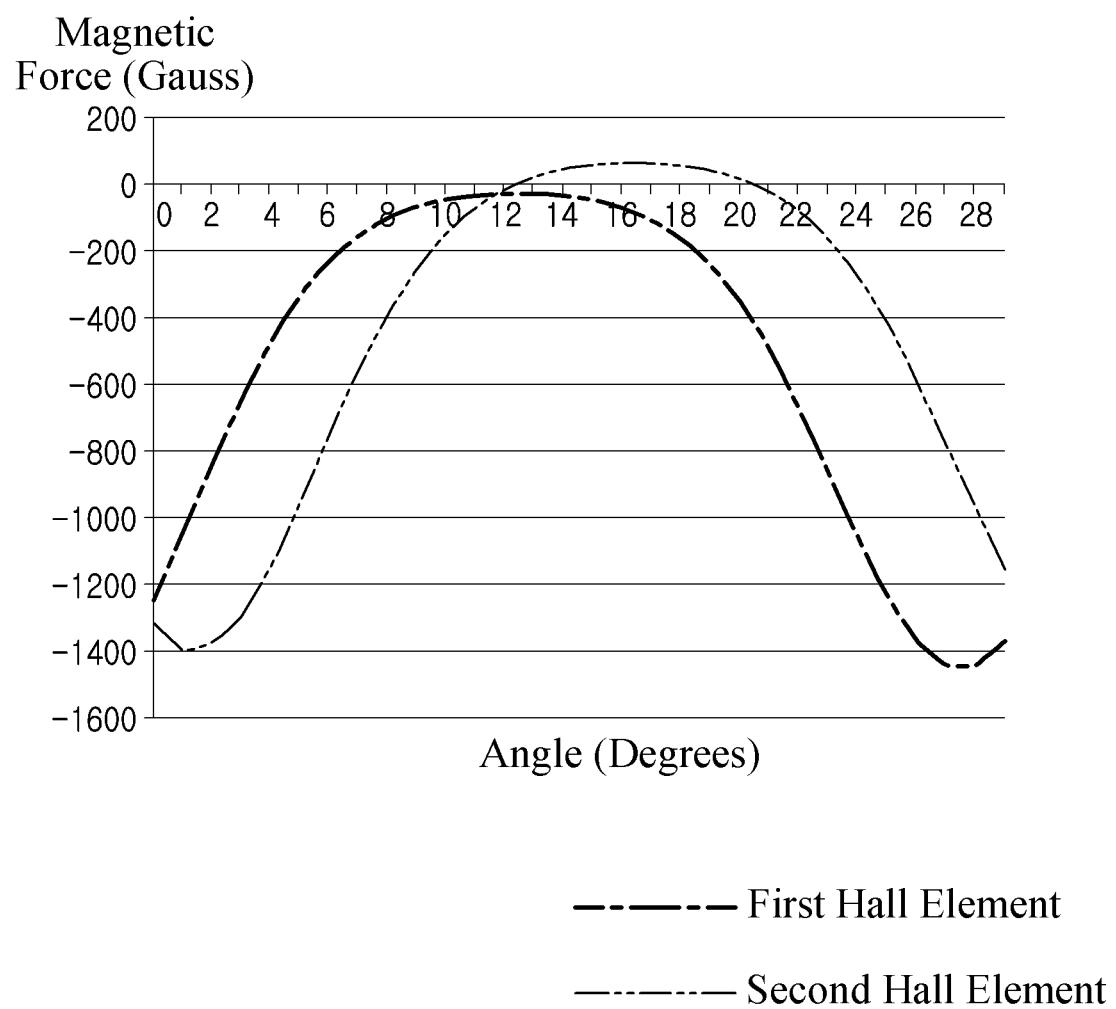
FIG. 4 is a graph illustrating output waveforms produced by the Hall elements as the rotatable member is rotated from 0 degree to 29 degrees by 1 degree increments in the first example of the apparatus.

The output, which was outputted from the each of the first Hall element 343 and the second Hall element 345, as the rotatable member 120 is rotated by an increment of 1 degree from the 0 degree to 29 degrees was measured. As a result, waveforms as shown in the example of FIG. 4 were obtained. Referring to the example of FIG. 4, as the rotatable member 120 is rotated from 0 degree to 20 degrees, it is observable that the output (magnetic force) of the first Hall element 343 rises from about −1200 to about 0, and then descends to about −1400. Additionally, in the example of the second Hall element 345, as the rotatable member 120 is rotated from 0 degree to 29 degrees, it is observable that the output (magnetic force) of the second Hall element 345 rises from about −1400 to about 80, and then descends to about −1200. The rotated angle of the rotatable member 120 is able to be inferred based on the outputs of the Hall elements by using the output waveforms of the first Hall element 343 and the second Hall element 345. That is, it has been recognized that if the output waveforms of the Hall elements 343, 345 are expressed as an equation in which the output waveforms of the Hall elements 343, 345 are input variables and the rotation angle of the rotatable member 120 is an output variable, when the output values of the Hall elements 343, 345 are known, the rotation angle of the rotatable member 120 is determined by substituting the output values of the Hall elements 343, 345 into the equation, wherein the equation is an equation chosen to produce appropriate results. The present examples are intended to detect the rotation angle of the rotatable member 120 based on the recognition.

However, because there are portions revealed to have resulted from the measurement errors in the output waveforms of the Hall elements 343, 345 due to the sensing error associated with the Hall elements 343 and 345 and/or the magnetic force difference between magnet pieces 330, only the remaining portions excluding the portions resulting from the measurement errors in the output waveforms of the Hall elements 343, 345 are able to be advantageously used. FIG. 5 is a graph where the remaining portions in the output waveforms of the Hall elements 343, 345 are indicated by solid lines. In the following description, the portions indicated by the solid lines ware referred to as Segment S1 to Segment S4, respectively. The following Equation 1 to Equation 4 are obtained when Segment S1 to Segment S4 are approximated to be fit by equations, respectively, by using a curve fitting algorithm. Table 1 shows coefficient values in Equation 1 to Equation 4, wherein the coefficient values are values that can vary according to the design variables of the apparatus 100.

Equation 1

$$y_1 = a_1 x^3 + b_1 x^2 + c_1 x + d_1 \quad \text{(Segment S1)}$$

Here, x is a variable indicative of the output of the first Hall element 343, and y is a variable indicative of the rotation angle of the rotatable member 120.

Equation 2

$$y_2 = a_2 x^3 + b_2 x^2 + c_2 x + d_2 \quad \text{(Segment S2)}$$

Here, x is a variable indicative of the output of the second Hall element 345, and y is a variable indicative of the rotation angle of the rotatable member 120.

Equation 3

$$y_3 = a_3 x^3 + b_3 x^2 + c_3 x + d_3 \quad \text{(Segment S3)}$$

Here, x is a variable indicative of the first Hall element 343, and y is a variable indicative of the rotation angle of the rotatable member 120.

Equation 4

$$y_4 = a_4 x^3 + b_4 x^2 + c_4 X + d_4 \quad \text{(Segment S4)}$$

Here, x is a variable indicative of the output of the second Hall element 345, and y is a variable indicative of the rotation angle of the rotatable member 120.

TABLE 1

| i | $a_i$ | $b_i$ | $c_i$ | $d_i$ |
|---|---|---|---|---|
| 1 | $4.017e^{-8}$ | $4.737e^{-5}$ | 0.02905 | 10.75 |
| 2 | $8.596e^{-7}$ | 0.0002281 | 0.03143 | 12.47 |
| 3 | $-3.823e^{-8}$ | $-4.522e^{-5}$ | -0.02794 | 14.36 |
| 4 | $-3.004e^{-9}$ | $-7.284e^{-6}$ | -0.01091 | 21.49 |

A value of the rotation angle that falls within an angle range of $\alpha_1$ (0 degree$\leq \alpha_1 <$8 degrees) is obtained when the output of the first Hall element 343 is converted into the rotation angle by using Equation 1, which is an equation for Segment S1. A value of the rotation angle that falls within an angle range of $\alpha_2$ (8 degrees$\leq \alpha_2 <$15 degrees) is obtained when the output of the second Hall element 345 is converted into the rotation angle by using Equation 2, which is an equation for Segment S2. A value of the rotation angle that falls within an angle range of $\alpha_3$ (15 degrees$\leq \alpha_3 <$25 degrees) is obtained when the output of the first Hall element 343 is converted into the rotation angle by using Equation 3, which is an equation for Segment S3. A value of the rotation angle that falls within an angle range of $\alpha_4$ (25 degrees$\leq \alpha_4 <$30 degrees) is obtained when the output of the second Hall element 345 is converted into the rotation angle by using Equation 4, which is an equation for Segment S4. By considering a magnitude of the output of first Hall element 343 and by comparing the magnitude of the output of the first Hall element 343 and a magnitude of the output of the second Hall element 345, it is possible to know whether the rotation angle of the rotatable member 120 falls within any one of the angle ranges $\alpha_1$ to $\alpha_4$, that is, whether the output of any one of the first Hall element 343 and the second Hall element 345 should be substituted into any one of Equations 1 to 4. Such a process is summarized further as follows.

A first example occurs when the output of the first Hall element 343 is substituted into Equation 1, which occurs when the rotation angle of the rotatable member 120 falls within the angle range $\alpha_1$ of 0 degree$\leq \alpha_1 <$8 degrees.

In such an example, the output of the first Hall element 343 is less than −100 and greater than −1,200 and the output of the first Hall element 343 is greater than the output of the second Hall element 345.

A second example occurs when the output of the second Hall element 345 is substituted into Equation 2, which occurs when the rotation angle of the rotatable member 120 falls within the angle range $\alpha_2$ of 8 degrees$\leq \alpha_2 <$15 degrees.

In such an example, the output of the first Hall element 343 is greater than −100.

A third example occurs when the output of the first Hall element 343 is substituted into Equation 3, which occurs when the rotation angle of the rotatable member 120 falls within the angle range falls with the angle range $\alpha_3$ of 15 degrees$\leq \alpha_3 <$25 degrees.

In such an example, the output of the first Hall element 343 is less than −100 and greater than −1,200, and the output of the first Hall element 343 is less than the output of the second Hall element 345.

A fourth example occurs when the output of the second Hall element 345 is substituted into Equation 4, which occurs when the rotation angle of the rotatable member 120 falls within the angle range $\alpha_4$ of 25 degrees$\leq \alpha_4 <$30 degrees.

In such an example, the output of the first Hall element 343 is less than −1,200.

Therefore, the rotation angle of the rotatable member 120 is detected by checking whether the output of the first Hall element 343 and the output of the second Hall element 345 satisfy any one of the above-mentioned conditions and by using any one of Equations 1 to 4 accordingly. However, it should be understood that the values of −100 and −1,200 for the output of the first Hall element 343 and the output of the second Hall element 345 in the conditions may be changed according to the design parameters.

With reference to the example of FIG. 5, an example of detecting the rotation angle of the rotatable member 120 according to the conditions is described. Assuming that the output of the first Hall element 343 has a value of −400, in this example, the output of the second Hall element 345 has a value of −1,000. In this example, because the output of the first Hall element 343 is less than −100 and greater than −1,200 and the output of the first Hall element 343 is greater than of the output of the second Hall element 345, the output of the first Hall element 343 falls within the angle range $\alpha_1$ of 0 degree$\leq \alpha_1 <$8 degrees. Therefore, the following result is obtained when substituting the output of the first Hall element 343 into Equation 1.

$$y_1 = 4.017e^{-8} *(-400)^3 + 4.737e^{-5} *(-400)^2 + 0.02905*(-400) + 10.75 = 4.13832 \quad \text{Equation 5}$$

Therefore, the calculation result for the rotation angle becomes 4 degrees. However, the actual rotation angle is not determined solely by the calculation result. When the rotatable member 120 is rotated by an angle corresponding to multiples of 30, the relative disposition of the magnet pieces 330 for the Hall sensor 340 becomes the same as when the rotatable member 120 is in the reference position Pr. Therefore, the calculated rotation angle of the rotatable member 120 becomes 0 degree. Thus, even if the rotation angle is calculated as being 4 degrees, the actual rotation angle of the rotatable member 120 may be any one of 4 degrees, 34 degrees, 64 degrees, 94 degrees, 124 degrees, 154 degrees, 184 degrees, 214 degrees, 244 degrees, 274 degrees, 304 degrees and 334 degrees, as appropriate. According to the present examples, the outputs from the Hall elements 343, 345 are sampled at a sampling period of several milliseconds or several microseconds, a plurality of rotation angles are detected even when the rotatable member 120 is being rotated, and the values of the rotation angles are outputted. Therefore, it is possible to detect an angle closest to a rotation angle that has been detected just previously among the above-mentioned angles. In an example, if the previously detected rotation angle is 75 degrees, 64 degrees is detected as the actual rotation angle because an angle closest to 75 degrees among the above-mentioned angles is 64 degrees.

Referring back to the example of FIG. 2, according to the first example of the apparatus 100 for detecting the rotation angle, the controller 220 is configured to detect the rotation angle of the rotatable member 120 corresponding to the current rotated state of the rotatable member 120 by using the output of the first Hall element 343 and Equation 1, when the output of the first Hall element 343 is less than a first predetermined value and greater than a second predetermined value and the output value of the first Hall element 343 is larger than the output value of the second Hall element 345. For example, the controller 220 is further configured to determine the rotation angle of the rotatable member 120, based on the previously detected rotation angle of the rotatable member 120 and an angle, which is calculated by using the output of the first Hall element 343 and Equation 1. Accordingly, the controller 220 is configured to detect the rotation angle of the rotatable member 120 corresponding to the current rotated state of the rotatable member 120 by using the output of the second Hall element 345 and Equation 2, when the output of the first Hall element 343 is greater than the first predetermined value. For example, the controller 220 is further configured to determine the rotation angle of the rotatable member 120, based on the previously detected rotation angle of the rotatable member 120 and an angle that is calculated by using the output of the second Hall element 345 and Equation 2. In another example, the controller 220 is configured to detect the rotation angle of the rotatable member 120 corresponding to the current rotated state of the rotatable member 120 by using the output of the first Hall element 343 and Equation 3, when the output of the first Hall element 343 is less than the first predetermined value and greater than the second predetermined value and the output of the first Hall element 343 is less than the output of the second Hall element 345. Thus, the controller 220 is further configured to determine the rotation angle of the rotatable member 120, based on the previously detected rotation angle of the rotatable member 120 and an angle that is calculated by using the output of the first Hall element 343 and Equation 3. Also, the controller 220 is configured to detect the rotation angle of the rotatable member 120 corresponding to the current rotated state of the rotatable member 120 by using the output of the second Hall element 345 and Equation 4, when the output of the first Hall element 343 is less than the second predetermined value. In such an example, the controller 220 is further configured to determine the rotation angle of the rotatable member 120, based on the previously detected rotation angle of the rotatable member 120 and an angle that is calculated by using the output of the second Hall element 345 and Equation 4.

It is indicated that the controller 220 detects the rotation angle of the rotatable member 120 by using the equations in the above-mentioned description. However, it is also possible to detect the rotation angle of the rotatable member 120 by using first to fourth mapping tables instead of the equations. The first and third mapping tables define mapping relationships between the outputs of the first Hall element 343 and the rotation angles of the rotatable member 120, and the second and fourth mapping tables define mapping relationships between the outputs of the second Hall element 345 and the rotation angles of the rotatable member 120. For example, the first to fourth mapping tables are stored in the storage 230. In such an example, the first mapping tab table is determined based on the first segment (Segment S1) of the output waveform outputted from the first Hall element 343 as the rotatable member 120 is rotated up to 29 degrees. The second mapping table is determined based on the first segment (Segment S2) of the output waveform outputted from the second Hall element 345 as the rotatable member 120 is rotated up to 29 degrees. The third mapping table is determined based on the second segment (Segment S3) of the output waveform outputted from the first Hall element 343 as the rotatable member 120 is rotated up to 29 degrees. The fourth mapping table is determined based on the second segment (Segment S4) of the output waveform outputted from the second Hall element 345 as the rotatable member 120 is rotated up to 29 degrees.

Thus, the controller 220 is configured to detect the rotation angle of the rotatable member 120 corresponding to the current rotated state of the rotatable member 120 by using the output of the first Hall element 343 and the first mapping table, when the output of the first Hall element 343 is less than the first predetermined value and greater than the second predetermined value and the output of the first Hall element 343 is greater than the output of the second Hall element 345. The controller 220 is configured to detect the rotation angle of the rotatable member 120 corresponding to the current rotated state of the rotatable member 120 by using the output of the second Hall element 345 and the second mapping table, when the output of the first Hall element 343 is greater than the first predetermined value. The controller 220 is configured to detect the rotation angle of the rotatable member 120 corresponding to the current rotated state of the rotatable member 120 by using the output of the first Hall element 343 and the third mapping table, when the output of the first Hall element 343 is less than the first predetermined value and greater than the second predetermined value and the output of the first Hall element 343 is less than the output of the second Hall element 345. The controller 220 is configured to detect the rotation angle of the rotatable member 120 corresponding to the current stated state of the rotatable member 120 by using the output of the second Hall element 345 and the fourth mapping table, when the output of the first Hall element 343 is less than the second predetermined value.

Figure 6A:
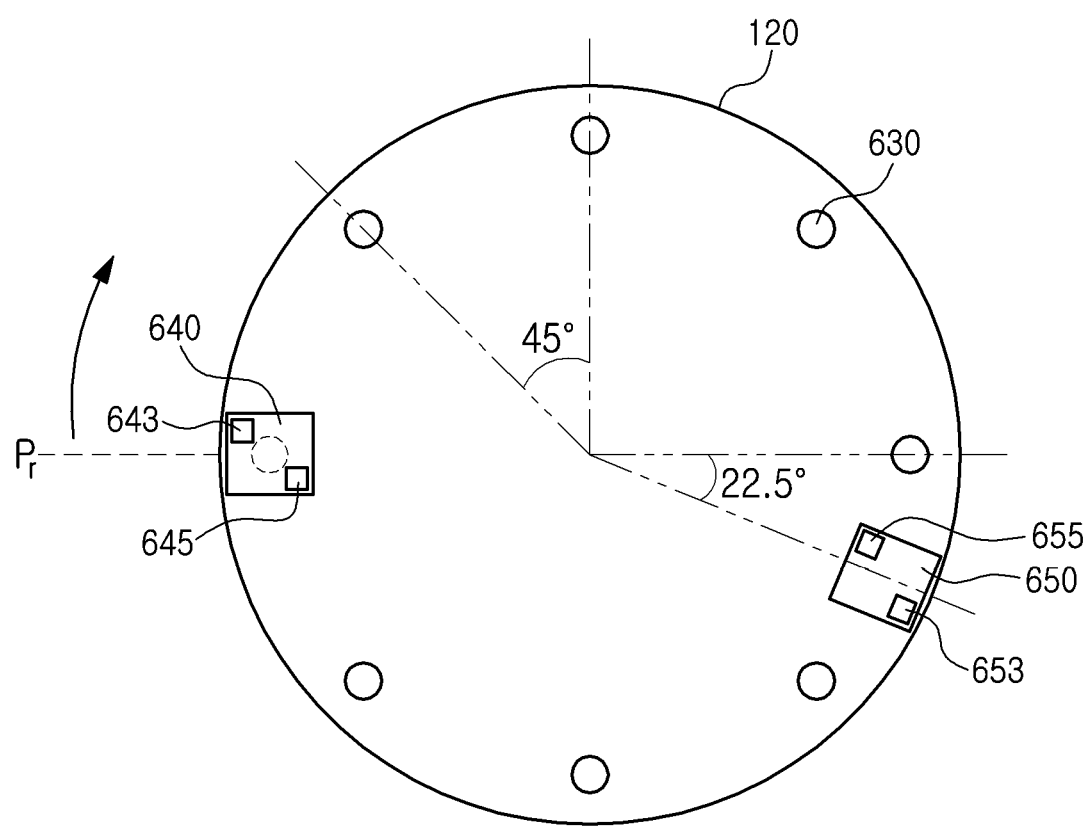
FIGS. 6A and 6B are views to explain a second example of the apparatus for detecting an angle of rotation.
Figure 6B:
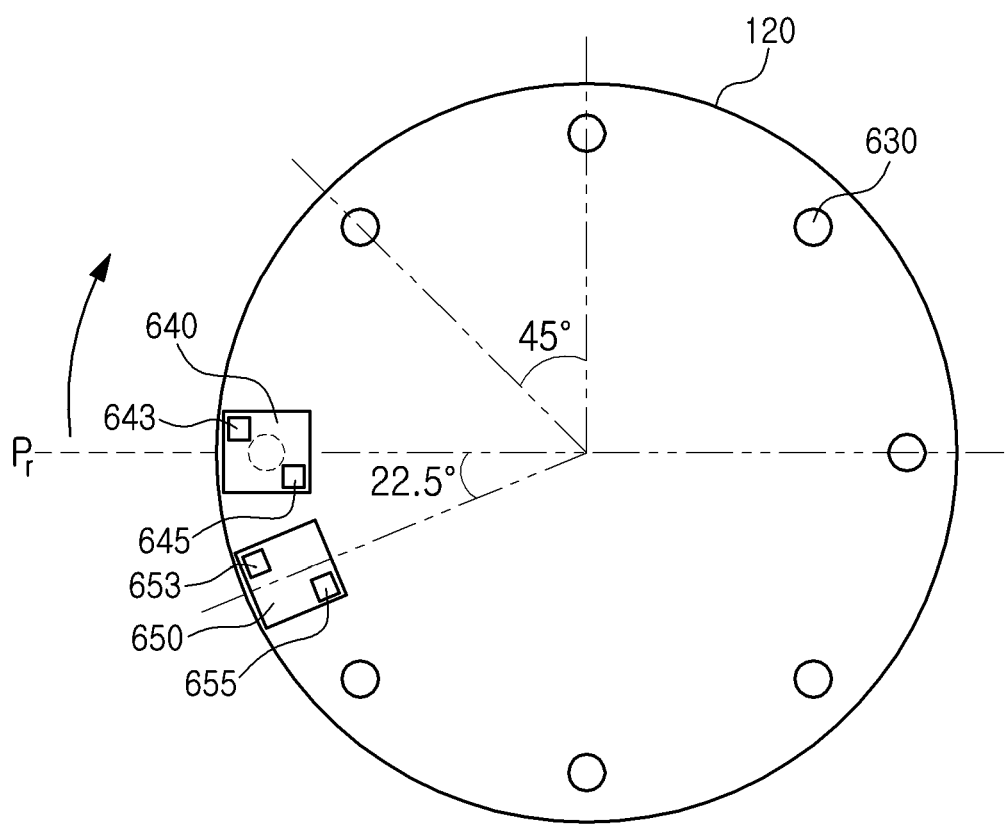

FIGS. 6A and 6B are views to explain a second example of the apparatus for detecting the angle of rotation.

As shown in FIGS. 6A and 6B, in the second example of the apparatus for detecting the angle of rotation, the eight magnet pieces 630 are arranged on the bottom of the rotatable member 120 by intervals of 45 degrees along the circumferential direction of the rotatable member 120. When the magnet pieces 630 are arranged at the intervals of 45 degrees, the magnetic field measurement range of the Hall elements is at most 30 degrees. Therefore, there is a dead zone of 15 degrees. In order to measure the magnetic force in the dead zone, it is necessary to further dispose an additional Hall sensor by comparison with the first example. Therefore, in the second example, two Hall sensors of a first Hall sensor 640 and a second Hall sensor 650 are disposed on the bottom of the rotatable member 120. Assuming that the magnet pieces 630 lie on the first plane and the magnet pieces 630 move along the first locus of circumferential direction of the magnet pieces 630 as the rotatable member 120 is rotated, the Hall sensors 640, 650 are positioned on a second locus. The second locus is a projection of the first locus into the second plane, which is substantially parallel to the first plane and is spaced by a predetermined distance apart from the first plane. For example, the first Hall sensor 640 is disposed in an opposite relationship to one of the magnet pieces 630 when the rotatable member is in the reference position Pr. The second Hall sensor 650 is disposed at an interval of any one angle selected from 15 degrees to 30 degrees. In the example, the second Hall sensor 650 is disposed at an angle interval of 22.5 degrees with the first Hall sensor 640. The first Hall sensor 640 includes two planar Hall elements. That is, the first Hall sensor 650 includes a first Hall element 643 and a second Hall element 645. The second Hall sensor 650 also includes a third Hall element 653 and a fourth Hall element 655, which are the planar Hall elements. As the rotatable member 120 is rotated up to 45 degrees, each of the Hall elements 643, 645, 653, 655 provides the corresponding magnetic force as its output.

Figure 8:
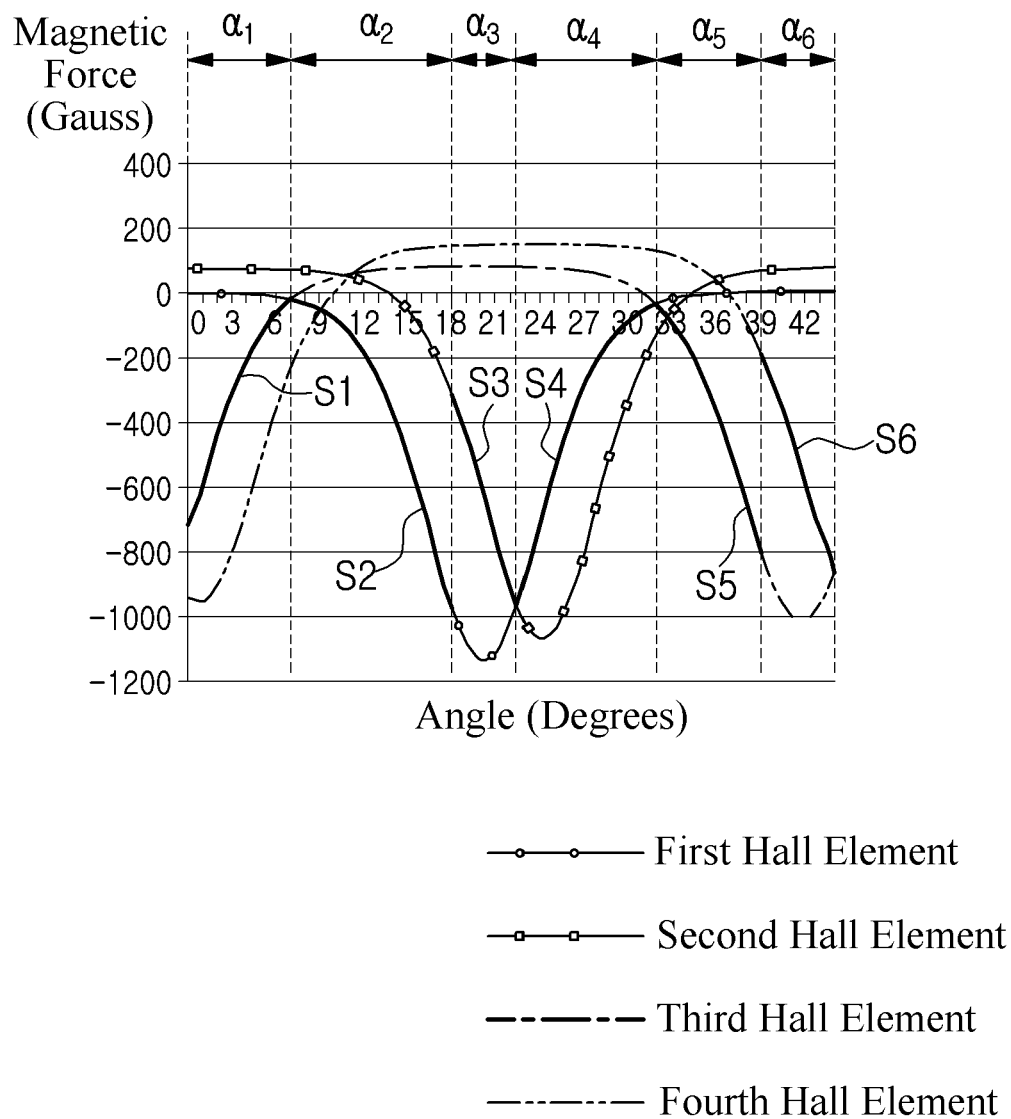
FIG. 8 is a graph where the remaining portions excluding the portions determined to have resulted from measurement errors in the output waveforms in FIG. 7 are indicated by solid lines, according to an example.

In the same manner of the example, as the rotatable member 120 is rotated by 1 degree increments from 0 degree to 44 degrees, the outputs outputted from each of the Hall elements 643, 645, 653, 655 are measured and are shown as the waveforms in FIG. 7. FIG. 8 is a graph where the remaining portions excluding the portions determined to have resulted from measurement errors in the output waveforms in FIG. 7 are indicated by solid lines. In the following description, the portions indicated by the solid lines are referred to as Segment S1 to Segment S6. The following Equation 6 to Equation 11 are obtained when Segment S1 to Segment S6 are approximated to by equations, respectively, by using a curve fitting algorithm. Table 2 shows coefficient values in Equation 6 to Equation 11, wherein the coefficient values are values that are able to vary according to the design variables of the apparatus 100.

Equation 6

$$y_1 = a_1 x^3 + b_1 x^2 + c_1 x + d_1 \quad \text{(Segment S1)}$$

In Equation 6, x is a variable indicative of the output of the third Hall element 653, and $y_1$ is a variable indicative of the rotation angle of the rotatable member 120.

Equation 7

$$y_2 = a_2 x^3 + b_2 x^2 + c_2 x + d_2 \quad \text{(Segment S2)}$$

In Equation 7, x is a variable indicative of the output of the first Hall element 643, and $y_2$ is a variable indicative of the rotation angle of the rotatable member 120.

Equation 8

$$y_3 = a_3 x^3 + b_3 x^2 + c_3 x + d_3 \quad \text{(Segment S3)}$$

In Equation 8, x is a variable indicative of the output of the second Hall element 645, and $y_3$ is a variable indicative of the rotation angle of the rotatable member 120.

Equation 9

$$y_4 = a_4 x^3 + b_4 x^2 + c_4 X + d_4 \quad \text{(Segment S4)}$$

In Equation 9, x is a variable indicative of the output of the first Hall element 643, and $y_4$ is a variable indicative of the rotation angle of the rotatable member 120.

Equation 10

$$y_5 = a_5 x^3 + b_5 x^2 + c_5 X + d_5 \quad \text{(Segment S5)}$$

In Equation 10, x is a variable indicative of the output of the third Hall element 653, and $y_5$ is a variable indicative of the rotation angle of the rotatable member 120.

Equation 11

$$y_6 = a_6 x^3 + b_6 x^2 + c_6 X + d_6 \quad \text{(Segment S6)}$$

In Equation 11, x is a variable indicative of the output of the fourth Hall element 655, and $y_6$ is a variable indicative of the rotation angle of the rotatable member 120.

TABLE 2

| i | $a_i$ | $b_i$ | $c_i$ | $d_i$ |
|---|---|---|---|---|
| 1 | $1.594e^{-8}$ | $2.548e^{-5}$ | 0.02004 | 10.07 |
| 2 | $-4.273e^{-8}$ | $-6.251e^{-5}$ | $-0.03558$ | 9.089 |
| 3 | $-1.045e^{-8}$ | $-1.864e^{-5}$ | $-0.01681$ | 16.05 |
| 4 | $4.795e^{-8}$ | $6.485e^{-5}$ | 0.0354 | 34.4 |
| 5 | $-2.536e^{-8}$ | $-3.607e^{-5}$ | $-0.02329$ | 34.01 |
| 6 | $-8.135e^{-9}$ | $-1.308e^{-5}$ | $-0.01349$ | 39.83 |

A value of the rotation angle that falls within an angle range of $\alpha_1$ of 0 degrees$\leq \alpha_1 <7$ degrees is obtained when the output of the third Hall element 653 is converted into the rotation angle by using Equation 6, which is an equation for Segment S1. A value of the rotation angle that falls within an angle range of $\alpha_2$ of 7 degrees$\leq \alpha_2 <18$ degrees is obtained when the output of the first Hall element 643 is converted into the rotation angle by using Equation 7, which is an equation for Segment S2. A value of the rotation angle that falls within an angle range of $\alpha_3$ of 18 degrees$\leq \alpha_3 <22$ degrees is obtained when the output of the second Hall element 645 is converted into the rotation angle by using Equation 8, which is an equation for Segment S3. A value of the rotation angle that falls within an angle range of $\alpha_4$ of 22 degrees$\leq \alpha_4 <32$ degrees is obtained when the output of the first Hall element 643 is converted into the rotation angle by using Equation 9, which is an equation for Segment S4. A value of the rotation angle that falls within an angle range of $\alpha_5$ of 32 degrees$\leq \alpha_5 <39$ degrees is obtained when the output of the third Hall element 653 is converted into the rotation angle by using Equation 10, which is an equation for Segment S5. A value of the rotation angle which falls within an angle range of $\alpha_6$ of 39 degrees$\leq \alpha_6 <44$ degrees is obtained when the output of the fourth Hall element 655 is converted into the rotation angle by using Equation 11, which is an equation for Segment S6. By considering a magnitude of the output of first Hall element 643 or the third Hall element 653 and by comparing the magnitudes of the outputs of the Hall elements 643, 645, 653, 655 with each other, it is possible to know whether the rotation angle of the rotatable member 120 falls within any one of the angle ranges $\alpha_1$ to $\alpha_6$, that is, whether the output of any one of the Hall elements 643, 645, 653, 655 is to be substituted into any one of Equations 6 to 11. This process is summarized as follows.

First, when the output of the third Hall element 653 is substituted into Equation 6, which occurs when the rotation angle of the rotatable member 120 falls within the angle range $\alpha_1$ of 0 degrees$\leq \alpha_1 <7$ degrees, the output of the third Hall element 653 is less than $-10$ and greater than $-800$ and the output of the third Hall element 653 is greater than the output of the fourth Hall element 655.

Second, when the output of the first Hall element 643 is substituted into Equation 7, which occurs when the rotation angle of the rotatable member 120 falls within the angle range $\alpha_2$ of 7 degrees$\leq \alpha_2 <18$ degrees, The output of the first Hall element 643 is less than −10 and greater than −900, and the output of the first Hall element 643 is less than the output of the second Hall element 645.

Third, when the output of the second Hall element 645 is substituted into Equation 8, which occurs when the rotation angle of the rotatable member 120 falls within the angle range $\alpha_3$ of 18 degrees$\leq\alpha_3<$22 degrees, the output of the first Hall element 643 is less than −900.

Fourth, when the output of the first Hall element 643 is substituted into Equation 9, which occurs when the rotation angle of the rotatable member 120 falls within the angle range $\alpha_4$ of 22 degrees$\leq\alpha_4<$32 degrees, the output of the first Hall element 643 is less than −10 and greater than −900, and the output of the first Hall element 643 is greater than the output of the second Hall element 645.

Fifth, when the output of the third Hall element 653 is substituted into Equation 10, which occurs when the rotation angle of the rotatable member 120 falls within the angle range $\alpha_5$ of 32 degrees$\leq\alpha_5<$39 degrees, the output of the third Hall element 653 is less than −10 and greater than −800, and the output of the third Hall element 653 is less than the output of the fourth Hall element 655.

Sixth, when the output of the fourth Hall element 655 is substituted into Equation 11, which occurs when the rotation angle of the rotatable member 120 falls within the angle range $\alpha_6$ of 39 degrees$\leq\alpha_6<$44 degrees, the output of the third Hall element 653 is less than −800.

Thus, the rotation angle of the rotatable member 120 is detected by checking whether the outputs of the first Hall element 643 to the fourth Hall element 655 satisfy any one of the above-mentioned conditions and by using any one of Equations 6 to 11 accordingly. However, it is to be understood that the values of −10, −800 and −900 in the conditions may be changed according to the design parameters. When the calculation result for the rotation angle, which is calculated according to the conditions, is 20 degrees, the actual rotation angle of the rotatable member 120 is possibly any one of 20 degrees, 65 degrees, 110 degrees, 155 degrees, 200 degrees, 245 degrees, 290 degrees and 335 degrees. In this example, if the previously detected rotation angle is 75 degrees, 65 degrees is detected as being the actual rotation angle because an angle closest to 75 degrees among the above-mentioned angles is 65 degrees.

Referring back to the example of FIG. 2, according to the second example, the controller 220 is configured to detect the rotation angle of the rotatable member 120 corresponding to the current rotated state of the rotatable member 120 by using the output of the third Hall element 653 and Equation 6, when the output of the third Hall element 653 is less than the first predetermined value and greater than the second predetermined value and the output of the third Hall element 653 is greater than the output of the fourth Hall element 655. In an example, the controller 220 is further configured to determine the rotation angle of the rotatable member 120, based on the previously detected rotation angle and an angle, which is calculated by using the output of the third Hall element 653 and Equation 6. In such an example, the controller 220 is further configured to detect the rotation angle of the rotatable member 120 corresponding to the current rotated state of the rotatable member 120 by using the output of the first Hall element 643 and Equation 7, when the output of the first Hall element 643 is less than the first predetermined value and greater than a third predetermined value and the output of the first Hall element 643 is greater than the output of the second Hall element 645. In such an example, the control unit 220 is further configured to determine the rotation angle of the rotatable member 120, based on the previously detected rotation angle and an angle, which is calculated by using the output of the first Hall element 643 and Equation 7. The controller 220 is configured to detect the rotation angle of the rotatable member 120 corresponding to the current rotated state of the rotatable member 120 by using the output of the second Hall element 645 and Equation 8, when the output of the first Hall element 643 is less than the third predetermined value. The controller 220 is further configured to determine the rotation angle of the rotatable member 120, based on the previously detected rotation angle and an angle, which is calculated by using the output of the second Hall element 645 and Equation 8. The controller 220 is configured to detect the rotation angle of the rotatable member 120 corresponding to the current rotated state of the rotatable member 120 by using the output of the first Hall element 643 and Equation 9, when the output of the first Hall element 643 is less than the first predetermined value greater than the third predetermined value and the output of the first Hall element 643 is greater than the output of the second Hall element 645. The controller 220 is further configured to determine the rotation angle of the rotatable member 120, based on the previously detected rotation angle and an angle, which is calculated by using the output of the first Hall element 643 and Equation 9.

The control unit 220 is configured to detect the rotation angle of the rotatable member 120 corresponding to the current rotated state of the rotatable member 120 by using the output of the third Hall element 653 and Equation 10, when the output of the third Hall element 653 is less than the third predetermined value and greater than the second predetermined value and the output of the third Hall element 653 is less than the output of the fourth Hall element 655. The controller 220 is further configured to determine the rotation angle of the rotatable member 120, based on the previously detected rotation angle and an angle, which is calculated by using the output of the third Hall element 653 and Equation 10. The controller 220 is configured to detect the rotation angle of the rotatable member 120 corresponding to the current rotated state of the rotatable member 120 by using the output of the fourth Hall element 655 and Equation 11, when the output of the third Hall element 653 is less than the second predetermined value. The controller 220 is further configured to determine the rotation angle of the rotatable member 120, based on the previously detected rotation angle and an angle, which is calculated by using the output of the fourth Hall element 655 and Equation 11.

In the same manner as that of the first example, it is also possible that the controller 220 detects the rotation angle of the rotatable member 120 by using a plurality of mapping tables that define mapping relationships between the outputs of the Hall elements 643, 645, 653, 655 and the rotation angles of the rotatable member 120, instead of detecting the rotation angle of the rotatable member 120 by using the equations, in the second example.

Figure 9:
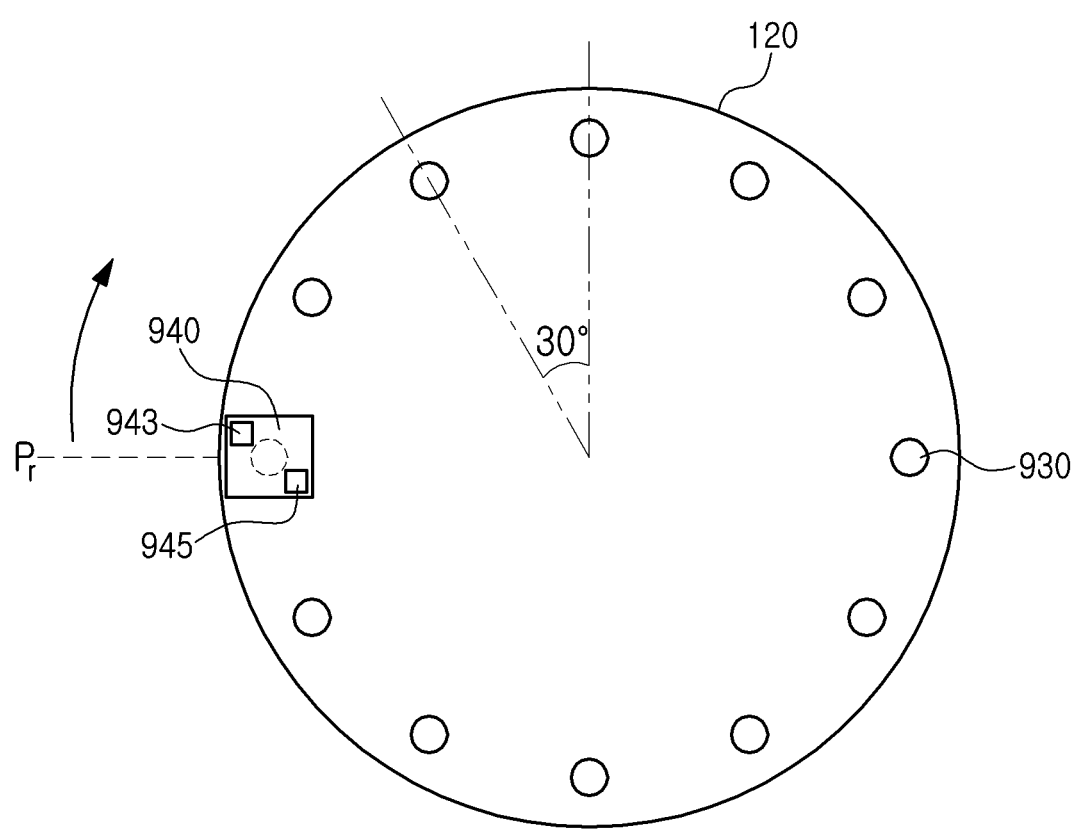
FIG. 9 is a view to explain a third example of the apparatus for detecting an angle of rotation.

FIG. 9 is a view to explain a third example of the apparatus for detecting an angle of rotation.

As shown in the example of FIG. 9, in the third example of the apparatus for detecting the angle of rotation according to the present examples, the twelve number of the magnet pieces 930 are arranged on the bottom of the rotatable member 120 at intervals of 30 degrees along the circumferential direction of the rotatable member 120, in the same manner of the first example. When the rotatable member 120 is in the reference position Pr, one Hall sensor 940 is disposed in an opposite relationship to one of the magnet pieces 930. The third example differs from the first example in that the Hall sensor 940 includes a first Hall element 943 that is a planar Hall element and a second Hall element 945 that is a vertical Hall element. While the rotatable member 120 is rotated up to 30 degrees, each of the Hall elements 943, 945 provides a corresponding magnetic force as its output.

Figure 10:
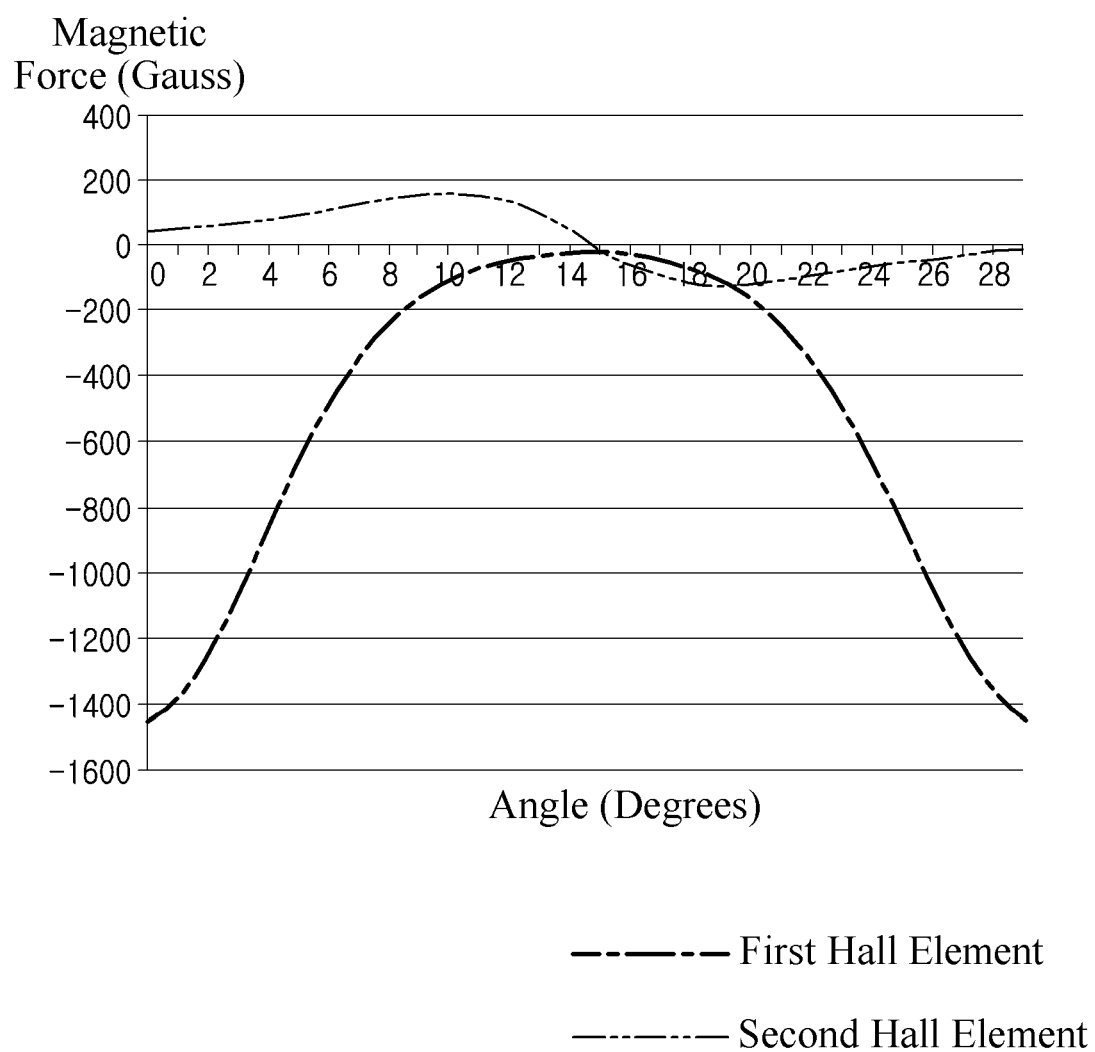
FIG. 10 is a graph illustrating output waveforms produced by the Hall elements as the rotatable member is rotated from 0 degree to 29 degrees by 1 degree increments in the third example of the apparatus.
Figure 11:
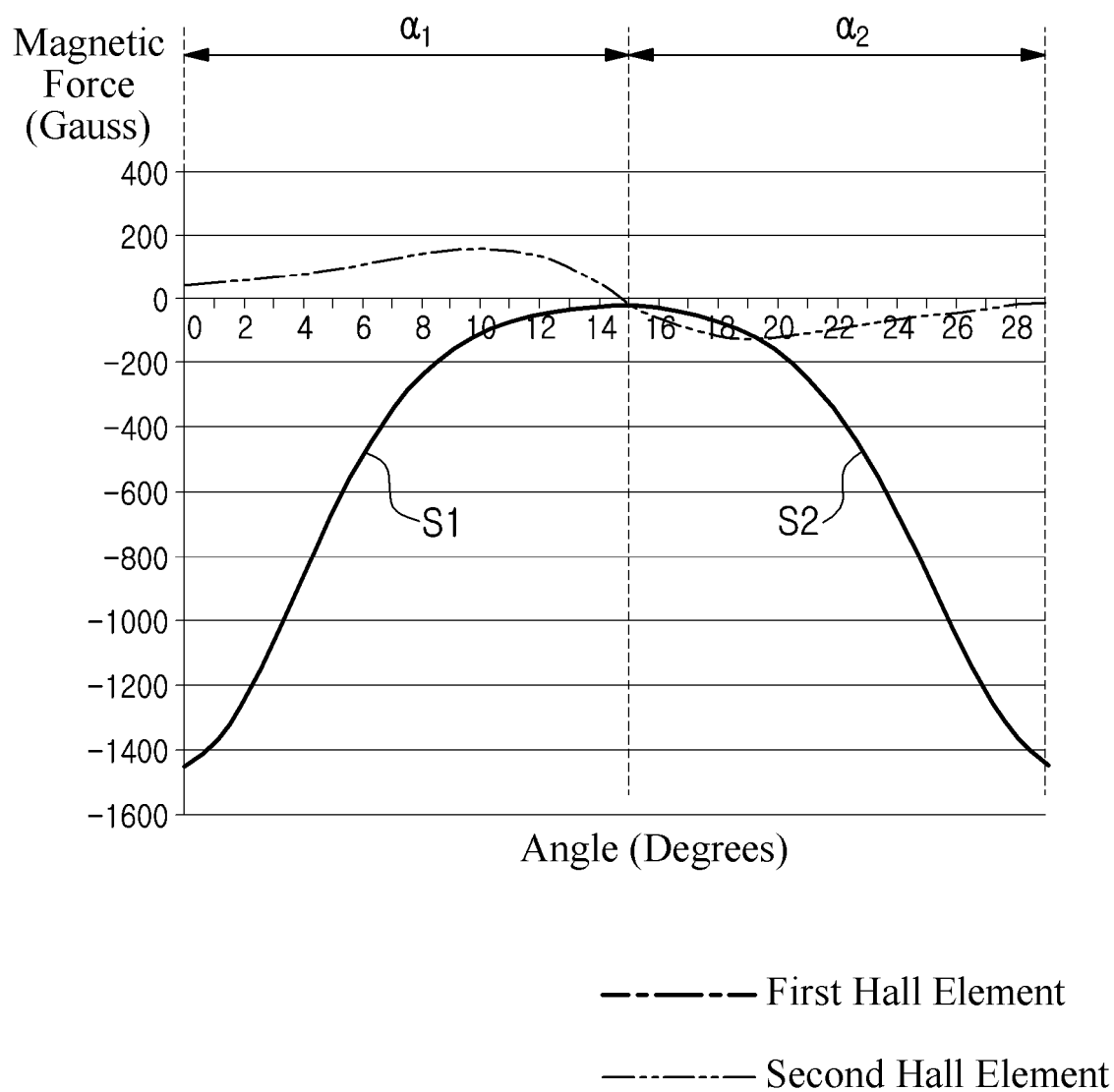
FIG. 11 is a graph where the output waveform of the first Hall element in FIG. 10 is divided into segments and indicated by solid lines.

In the same manner of the first example, as the rotatable member 120 is rotated by 1 degree increments from 0 degree to 29 degrees, the outputs outputted from each of the Hall elements 943, 945 are measured and are shown as the waveforms in the example of FIG. 10. FIG. 11 is a graph where the output waveform of the first Hall element in the example of FIG. 10 is divided into Segment S1 and Segment S2 and indicated by solid lines. The following Equation 12 and Equation 13 are obtained when Segment S1 to Segment S2 are approximated to equations, respectively, by using a curve fitting algorithm. Table 3 shows coefficient values in Equation 12 and Equation 13, wherein the coefficient values are values that can vary according to the design variables of the apparatus 100.

Equation 12

$$y_1 = a_1 x^3 + b_1 x^2 + c_1 x + d_1 \quad \text{(Segment S1)}$$

In Equation 12, x is a variable indicative of the output of the first Hall element 943, and $y_1$ is a variable indicative of the rotation angle of the rotatable member 120.

Equation 13

$$y_2 = a_2 x^3 + b_2 x^2 + c_2 x + d_2 \quad \text{(Segment S2)}$$

In Equation 13, x is a variable indicative of the output of the first Hall element 943, and $y_2$ is a variable indicative of the rotation angle of the rotatable member 120.

TABLE 3

| i | $a_i$ | $b_i$ | $c_i$ | $d_i$ |
|---|---|---|---|---|
| 1 | $4.273e^{-8}$ | $6.251e^{-5}$ | 0.03558 | 9.089 |
| 2 | $-4.795e^{-8}$ | $-6.485e^{-5}$ | -0.0354 | 34.4 |

A value of the rotation angle which falls within an angle range of $\alpha_1$ of 0 degrees$\leq \alpha_1 <$15 degrees is obtained when the output of the first Hall element 943 is converted into the rotation angle by using Equation 12 which is an equation for Segment S1. A value of the rotation angle which falls within an angle range of $\alpha_2$ of 15 degrees$\leq \alpha_2 <$29 degrees is obtained when the output of the first Hall element 943 is converted into the rotation angle by using Equation 13 which is an equation for Segment S2. By considering a magnitude of the output of second Hall element 945, it is possible to know whether the rotation angle of the rotatable member 120 falls within any one of the angle ranges $\alpha_1$ and $\alpha_2$, that is, whether the output of the first Hall element 943 is to be substituted into any one of Equations 12 and 13. This process is summarized as follows.

First, when the output of the first Hall element 943 is substituted into Equation 12, which occurs when the rotation angle of the rotatable member 120 falls within the angle range $\alpha_1$ of 0 degrees$\leq \alpha_1 <$15 degrees, the output of the second Hall element 945 is greater than 0.

Second, when the output of the first Hall element 943 is substituted into Equation 13, which occurs when the rotation angle of the rotatable member 120 falls within the angle range $\alpha_2$ of 15 degrees$\leq \alpha_2 <$29 degrees, the output of the second Hall element 643 is equal to or less than 0.

Therefore, the rotation angle of the rotatable member 120 is able to be detected by checking whether the output of the second Hall element 945 satisfies any one of the above-mentioned conditions and by using any one of Equations 12 and 13. However, it is to be understood that the value of 0 in the conditions can be changed according to the design parameters. When the calculation result for the rotation angle, which is calculated according to the conditions, is 20 degrees, the actual rotation angle of the rotatable member 120 may be any one of 20 degrees, 50 degrees, 80 degrees, 110 degrees, 140 degrees, 170 degrees, 200 degrees, 230 degrees, 260 degrees, 290 degrees, 320 degrees and 350 degrees. In this case, if the previously detected rotation angle is 75 degrees, 80 degrees is detected as being the actual rotation angle because an angle closest to 75 degrees from among the above-mentioned angles is 80 degrees.

Referring back to the example FIG. 2, according to the third example of the apparatus 100 for detecting the angle of rotation, the controller 220 is configured to detect the rotation angle of the rotatable member 120 corresponding to the current rotated state of the rotatable member 120 by using the output of the first Hall element 943 and Equation 12, when the output of the second Hall element 945 is greater than a predetermined value. The controller 220 is further configured to determine the rotation angle of the rotatable member 120, based on the previously detected rotation angle and an angle that is calculated by using the output of the first Hall element 943 and Equation 12. The controller 220 is configured to detect the rotation angle of the rotatable member 120 corresponding to the current rotated state of the rotatable member 120 by using the output of the first Hall element 943 and Equation 13, when the output of the second Hall element 945 is equal to or less than the predetermined value. The controller 220 is further configured to determine the rotation angle of the rotatable member 120, based on the previously detected rotation angle and an angle, which is calculated by using the output of the first Hall element 943 and Equation 13.

In the same manner of the first and second examples, it is also possible that the controller 220 detects the rotation angle of the rotatable member 120 by using a plurality of mapping tables that define mapping relationships between the outputs of the Hall elements 943, 945 and the rotation angles of the rotatable member 120, instead of detecting the rotation angle of the rotatable member 120 by using the equations, in the third example.

Although it is described that the twelve number of magnet pieces are arranged on the rotatable member at intervals of 30 degrees or the eight number of magnet pieces are arranged on the rotatable member at intervals of 45 degrees in the above-mentioned examples, it is also possible that the six number of magnet pieces are arranged on the rotatable member at the interval of 60 degrees or the ten number of the magnet pieces are arranged on the rotatable member at the interval of 36 degrees, by way of example. When six magnet pieces are arranged on the rotatable member at intervals of 60 degrees, in the same manner of the second example, the two Hall sensors are disposed at an interval of 30 degrees from each other in order to cover the dead zone of 30 degrees. Also, when ten magnet pieces are arranged on the rotatable member at the interval of 36 degrees from each other, the two Hall sensors may be disposed at the interval of any one angle selected from 15 degrees to 21 degrees from each other in order to cover the dead zone of 6 degrees.

According to the disclosed examples, there is a technical effect that it is possible to provide an apparatus for detecting an angle of rotation in which the resolution of detecting the rotation angle is improved, and thus the detection error is minimized.

According to the disclosed examples, there is a technical effect that it is possible to provide the apparatus for detecting the angle of rotation that is able to be easily applied to various user interface implementations by being mounted on a wearable device which is unable to dispose magnets in the center of the rotatable member or a device which has a limited arrangement of the magnets.

In the examples disclosed herein, the arrangement of the illustrated components may vary depending on an environment or requirements to be implemented. For example, some of the components may be omitted or several components may be integrated and carried out together. In addition, the arrangement order of some of the components can be changed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for detecting an angle of rotation, comprising:
   a rotatable member situated in a first plane and rotatable to be switched between a reference state and rotated states, the rotatable member being unrotated in the reference state;
   magnet pieces arranged on the rotatable member along a circumferential direction of the rotatable member at intervals of an angle, the magnet pieces moving along a first locus as the rotatable member is rotated;
   a Hall sensor comprising a first Hall element and a second Hall element spaced apart from each other, situated in a second plane spaced a predetermined distance apart from the first plane, and positioned along a second locus, the second locus being a projection of the first locus into the second plane, and the Hall sensor providing a first output from the first Hall element and a second output from the second Hall element varying as the rotatable member is rotated; and
   a processor configured to detect an angle of rotation of the rotatable member in response to receiving the first output and the second output from the Hall sensor based on the first and second outputs and using an equation that is a cubic polynomial,
   wherein the equation is $y_i = a_i x^3 + b_i x^2 + c_i x + d_i$, and
   wherein x is a variable indicative of an output of an $i^{th}$ Hall element, $y_i$ is a variable indicative of the angle of rotation of the rotatable member, and i is a positive integer.

2. The apparatus of claim 1, wherein the rotatable member is a disc-shaped plate or a ring-shaped plate.

3. The apparatus of claim 1, wherein the Hall sensor is located to be opposite to one of the magnet pieces when the rotatable member is in the reference state.

4. The apparatus of claim 1, wherein the magnet pieces comprise 12 magnet pieces.

5. The apparatus of claim 1, wherein the processor is further configured to detect the angle of rotation of the rotatable member based on the first and second outputs.

6. The apparatus of claim 1, wherein the processor is further configured to detect the angle of rotation of the rotatable member using the first output and a first equation that is a cubic polynomial, in response to the first output being less than a first predetermined value and greater than a second predetermined value and the first output being greater than the second output.

7. The apparatus of claim 6, wherein the processor is further configured to detect the angle of rotation of the rotatable member using the second output and a second equation that is a cubic polynomial, in response to the first output being greater than the first predetermined value.

8. The apparatus of claim 7, wherein the processor is further configured to detect the angle of rotation of the rotatable member using the first output and a third equation that is a cubic polynomial, in response to the first output being less than the first predetermined value and greater than the second predetermined value and the first output being less than the second output.

9. The apparatus of claim 8, wherein the processor is further configured to detect the angle of rotation of the rotatable member using the second output and a fourth equation that is a cubic polynomial, in response to the first output being less than the second predetermined value.

10. The apparatus of claim 1, wherein the processor is further configured to detect the angle of rotation of the rotatable member using a mapping table.

11. The apparatus of claim 1, wherein the magnet pieces comprise 8 magnet pieces, the apparatus comprises a first Hall sensor and a second Hall sensor, the second Hall sensor being spaced a second predetermined angle apart from the first Hall sensor along the second locus, the first Hall sensor comprises the first Hall element and the second Hall element, the second Hall sensor comprises a third Hall element and a fourth Hall element, and the output from the first Hall sensor and the second Hall sensor comprises the first output from the first Hall element, the second output from the second Hall element, a third output from the third Hall element and a fourth output from the fourth Hall element.

12. The apparatus of claim 11, wherein the processor is further configured to detect the angle of rotation of the rotatable member based on the first to fourth outputs.

13. The apparatus of claim 12, wherein the processor is further configured to detect the angle of rotation of the rotatable member based on the first to fourth outputs and using the equation that is a cubic polynomial.

14. The apparatus of claim 13, wherein the processor is further configured to detect the angle of rotation of the rotatable member using the third output and a first equation that is a cubic polynomial, in response to the third output being less than a first predetermined value and greater than a second predetermined value and the third output being greater than the fourth output.

15. The apparatus of claim 14, wherein the processor is further configured to detect the angle of rotation of the rotatable member using the first output and a second equation that is a cubic polynomial, in response to the first output being less than the first predetermined value and greater than a third predetermined value and the first output being less than the second output.

16. The apparatus of claim 15, wherein the processor is further configured to detect the angle of rotation of the rotatable member using the second output and a third equation that is a cubic polynomial, in response to the first output being less than the third predetermined value.

17. The apparatus of claim 16, wherein the processor is further configured to detect the angle of rotation of the rotatable member using the first output and a fourth equation that is a cubic polynomial, in response to the first output being less than the first predetermined value and greater than the third predetermined value and the first output being greater than the second output.

18. The apparatus of claim 17, wherein the processor is further configured to detect the angle of rotation of the rotatable member using the third output and a fifth equation that is a cubic polynomial, in response to the third output being less than the first predetermined value and greater than the second predetermined value and the third output being less than the fourth output.

19. The apparatus of claim 18, wherein the processor is further configured to detect the angle of rotation of the rotatable member using the fourth output and a sixth equation that is a cubic polynomial, in response to the third output being less than the second predetermined value.

20. The apparatus of claim 1, wherein the magnet pieces comprise 12 magnet pieces, the Hall sensor comprises a planar Hall element and a vertical Hall element, and the output from the Hall sensor comprises the first output from the planar Hall element and the second output from the vertical Hall element.

21. The apparatus of claim 20, wherein the processor is further configured to detect the angle of rotation of the rotatable member based on the first and second outputs.

22. The apparatus of claim 21, wherein the processor is further configured to detect the angle of rotation of the rotatable member based on the first and second outputs and using the equation that is a cubic polynomial.

23. The apparatus of claim 22, wherein the processor is further configured to detect the angle of rotation of the rotatable member using the first output and a first equation that is a cubic polynomial, in response to the second output being greater than a value.

24. The apparatus of claim 23, wherein the processor is further configured to detect the angle of rotation of the rotatable member using the first output and a second equation that is a cubic polynomial, in response to the second output being equal to or less than a predetermined value.

25. An apparatus for detecting an angle of rotation, comprising:
a rotatable member rotatable about a center axis of the rotatable member;
twelve magnet pieces arranged in a manner spaced apart from one another along a circumferential direction of the rotatable member on a bottom surface of the rotatable member;
a Hall sensor located apart from the bottom surface of the rotatable member, wherein the Hall sensor comprises a first Hall element and a second Hall element spaced apart from each other, a magnet piece of the twelve magnet pieces passes above the Hall sensor as the rotatable member is rotated, and the first Hall element and the second Hall element respectively provide a first output and a second output varying as the rotatable member is rotated; and
a processor configured to detect an angle of rotation of the rotatable member in response to receiving the first output from the first Hall element and the second output from the second Hall element based on the first and second outputs and using an equation that is a cubic polynomial,
wherein the equation is $y_i = a_i x^3 + b_i x^2 + c_i x + d_i$, and
wherein x is a variable indicative of an output of an $i^{th}$ Hall element, $y_i$ is a variable indicative of the angle of rotation of the rotatable member, and i is a positive integer.

26. The apparatus of claim 25, wherein each of the first and second Hall elements is a planar Hall element, and the processor is further configured to detect an angle of rotation of the rotatable member based on the output from the first Hall element and the output from the second Hall element using four different equations that are cubic polynomials.

27. The apparatus of claim 25, wherein the first and second Hall elements are a planar Hall element and a vertical Hall element, respectively, and the processor is further configured to detect an angle of rotation of the rotatable member based on the output from the first Hall element and the output from the second Hall element using two different equations that are cubic polynomials.

28. The apparatus of claim 25, wherein the processor is further configured to detect an angle of rotation of the rotatable member using a mapping table.

29. An apparatus for detecting an angle of rotation, comprising:
a rotatable member rotatable about a center axis of the rotatable member;
eight magnet pieces arranged in a manner spaced apart from one another along a circumferential direction of the rotatable member on a bottom surface of the rotatable member;
two Hall sensors located apart from the bottom surface of the rotatable member,
wherein the two Hall sensors comprise a first Hall sensor and a second Hall sensor, the first Hall sensor comprises a first Hall element and a second Hall element spaced apart from each other, the second Hall sensor comprises a third Hall element and a fourth Hall element spaced apart from each other, each of the first and second Hall sensors is arranged so that a magnet piece of the eight number of magnet pieces passes above the respective Hall sensor as the rotatable member is rotated, and the first to fourth Hall elements respectively provide first to fourth outputs varying as the rotatable member is rotated; and
a processor configured to detect an angle of rotation of the rotatable member based on the first to fourth outputs received from the two Hall sensors using six different equations that are cubic polynomials based on the first to fourth outputs and using an equation that is a cubic polynomial,
wherein the equation is $y_i = a_i x^3 + b_i x^2 + c_i x + d_i$, and
wherein x is a variable indicative of an output of an $i^{th}$ Hall element, $y_i$ is a variable indicative of the angle of rotation of the rotatable member, and i is a positive integer.

30. The apparatus of claim 29, wherein the processor is further configured to detect an angle of rotation of the rotatable member using a mapping table.

* * * * *